United States Patent [19]

Fock et al.

[11] Patent Number: 4,745,152

[45] Date of Patent: May 17, 1988

[54] TRANSPARENT COATING OF FLEXIBLE, ELASTIC POLYURETHANE FOR TRANSPARENT GLASS OR SYNTHETIC RESIN SUBSTRATES

[75] Inventors: Juergen Fock, Duesseldorf; Günter Hahn, Mulheim/Ruhr; Gerhard Holzer; Helmer Rädisch, both of Aachen, all of Fed. Rep. of Germany

[73] Assignee: Saint-Gobain Vitrage, Courbevoie, France

[21] Appl. No.: 16,946

[22] Filed: Feb. 20, 1987

[30] Foreign Application Priority Data

Feb. 22, 1986 [DE] Fed. Rep. of Germany ....... 3605765

[51] Int. Cl.⁴ .............................................. C08G 18/38
[52] U.S. Cl. .................................. 524/718; 524/850; 528/71; 528/77
[58] Field of Search .................. 524/718, 850; 528/71, 528/77

[56] References Cited

U.S. PATENT DOCUMENTS 4,108,814 8/1978 Reiff et al. ............................ 528/71

Primary Examiner—Maurice J. Welsh
Attorney, Agent, or Firm—Oblon, Fisher, Spivak, McClelland & Maier

[57] ABSTRACT

A transparent coating for windows or other transparent substrates made of glass or synthetic resin, consisting of a flexible elastic polyurethane, serves as a shatterproofing coating for substrates made of silicate glass or as a coating improving the scratch resistance of substrates made of synthetic resin. To reduce or prevent the formation of a deposit of moisture on the surface of the coating, the polyol component of the reaction mixture for preparing a coating pursuant to the invention consists of a difunctional sulfonated polyether polyol containing approximately 1 to 10% of OH groups by weight and a trifunctional polyol containing approximately 8 to 12% of OH groups by weight and having an average molecular weight of approximately 400 to approximately 1000 g/mole.

15 Claims, No Drawings

TRANSPARENT COATING OF FLEXIBLE, ELASTIC POLYURETHANE FOR TRANSPARENT GLASS OR SYNTHETIC RESIN SUBSTRATES

BACKGROUND OF THE INVENTION

1. Field of the Invention

This invention concerns a transparent coating for windows or other transparent substrates made of glass or synthetic resin, consisting of flexible elastic polyurethane that is prepared from a reaction mixture whose isocyanate component consists of essentially trifunctional aliphatic polyisocyanates with a biuret or isocyanurate structure, formed on the basis of 1,6-hexamethylenediisocyanate, with an NCO group content of 15 to 25% by weight and a molecular weight of approximately 450 to 1000 g per mole, whose polyol component contains at least one polyfunctional polyol, and that may contain a reaction catalyst and other auxiliary substances.

2. Description of the Prior Art

When coatings of the above type are applied to silicate glass windows, they serve as shatterproofing coatings that prevent contact with the sharp edges of glass fragments when the window is broken. The glass windows with such coatings are particularly suitable as safety glass for automobiles, and are well known, for example, from the published German patent application AS No. 2,228,299 and German Patent 2,452,928.

Coatings of the type indicated are also known as coatings for substrates made of transparent plastic materials (published German patent application OS Nos. 2,058,504, 2,634,816, and 3,201,849). In this case, these polyurethane coatings serve to improve the scratch resistance of the substrate. The flexible elastic polyurethane coatings actually have the property that under stresses of common types that lead to surface deformations and scratches with the harder synthetic resins, they experience only an elastic deformation that disappears after a short time. This property is also called the "self-healing property".

These known transparent polyurethane coatings can be applied to the substrate by various procedures. Thus, it is known how to first produce sheets of this material and to laminate these sheets to the substrate with an adhesive interlayer (published German patent application AS No. 2,629,779). It is also known how to pour or spray the reaction mixture reacting to form the polyurethane onto the substrate, in which case layers of an adhesion promoter may be applied to the substrate in advance.

The known coatings of the type indicated have remarkable properties with regard to their resistance to abrasion or scratch resistance, transparency, and other properties in use. However, they have the property that by condensation of atmospheric moisture on their surface, a deposit of very fine droplets of water is formed that can be detrimental to vision through the window or the sheet.

SUMMARY OF THE INVENTION

The purpose of this invention is to modify these flexible elastic polyurethane coatings with self-healing properties of the type indicated above so that the formation of a deposit of obstructing moisture on their surface is lastingly diminished or prevented, while preserving their good mechanical, optical, and other properties.

This goal is attained pursuant to the invention by the fact that the polyol component of the reaction mixture used consists of a difunctional sulfonated polyether polyol with a content of OH groups of approximately 1 to 10% by weight, and a trifunctional polyol with a content of OH groups of approximately 8 to 12% by weight and a molecular weight of approximately 400 to approximately 1000 g per mole.

In accordance with the invention, because of a judicious modification of the composition of the polyol component of the reaction mixture, the resulting polyurethane coating is modified to the point of acquiring hydrophilic properties. In contrast to the known formulations for the preparation of reaction mixtures for the flexible elastic coating, difunctional polyether polyols that act as wetting agents on the droplets of water during their condensation and reduce the interfacial tension between the covering layer and the droplets of water, are incorporated in the coating pursuant to the invention, and accordingly also in the external surface. The coating in this way acquires hydrophilic properties and is able to spread out the water to the extent necessary. On the other hand, the physical-mechanical properties of the coating are not unacceptably modified by the addition of the difunctional sulfonated polyether polyols, but remain intact to a substantial extent.

In accordance with a preferred aspect of the invention, the sulfonated difunctional polyether polyol used in particular is a polyoxyalkylene ether of 1,2- or 1,3-diols of the formula $$R^1CH_2O-(C_2H_4O-)_n(C_3H_6O-)_mCH_2CHR^3CH_2-SO_2X$$

in which $R^1 = HO-CH_2-CH(OH)-$, $C(CH_2OH)_2(R^2)-$
$R^2 = CH_3-$, $C_2H_5-$, $C_3H_7$,
$R_3 = H-$ or $CH_3-$,
$X = H-$, alkali metal or ammonium ion
$n = 0$ to 100,
$m = 0$ to 30,
$n + m \geq 1$ for the polyol component, which preferably has an average molecular weight of approximately 500 to 5000 g per mole, for example approximately 2000 g per mole.

The sulfonated polyether polyols used pursuant to the invention are disclosed in German patent No. 3,407,563. It is also known that these compounds are suitable for the preparation or modification of polyurethanes and that the properties of the polymeric polyaddition products, in particular the surface properties, are influenced in this way. For example, it has been found that the adhesiveness properties of the curable adhesive polyurethanes are improved by the addition of the compounds indicated. However, the hydrophilic properties imparted are not based, or predictable from, these other changes.

Another improvement in the sense of optimizing the hydrophilic properties and the physical-mechanical properties of the coating can be obtained by using a sulfonated polyoxyalkylene ether that is formed of ethoxy and propoxy groups containing at least 50% by weight of ethoxy groups in the chain. Particularly good properties are achieved when the sulfonated polyoxyalkylene ether has an ethoxy/propoxy ratio of approximately 80:20.

DETAILED DESCRIPTION OF THE INVENTION

To evaluate the physical-mechanical properties of the flexible elastic polyurethane coating, the modulus E, the abrasion resistance and the microscratching hardness are determined as representative parameters, which taken together permit prediction of whether the coating will have the required self-healing properties and the necessary behavior in use. To this end, the modulus E is determined by the procedure described in the Standard DIN 53,457. To determine the abrasion resistance, the procedure described in the Standard ECE R-43 is used, in which two abrasive cylinders interact under a load of 500 g with the test specimen rotating for 100 revolutions. To evaluate the abrasion resulting from this stress, the increase of turbidity in comparison with the initial turbidity before the treatment is then determined by the procedure also described in the Standard ECE-R-43, and is indicated in % The microscratching hardness is determined by the procedure of Erichsen, for which an experimental assembly is used such as that described in the Standard DIN 53,799, except that the conical scratching diamond used has a cone angle of 50 degrees and a radius of curvature of 15 $\mu$m at the tip of the cone. To evaluate the microscratching hardness, the highest load weight on the scratching diamond for which no permanent visible lesion of the surface can be identified is specified.

It is known from experience that the self-healing transparent polyurethane coatings can be used as shatterproofing coatings when the modulus E of these coatings is between 2 and 20 N/mm$^2$, the increase of turbidity from abrasion according to ECE R-43 is below 4%, and the microscratching hardness by the Erichsen method is above 10 p. Likewise, the hydrophilic coatings are suitable for practical durable use only when the properties indicated within these limits.

To evaluate the wettability of the coating and accordingly its anticondensation effect, the contact angle of drops of water deposited on the surface of the coating is measured with a goniometer microscope. While the contact angle with the known flexible elastic polyurethane coatings that do not show an anticondensation effect is from 70 to 80 degrees, the contact angle with the coatings modified pursuant to the invention is reduced to 30 to 45 degrees.

Various examples of embodiments are described below within the scope of the claimed compositions, and the mechanical and anticondensation properties measured on each of these coatings are indicated.

EXAMPLE 1

A reaction mixture is prepared in which a sulfonated difunctional polyoxyalkylene ether with an average molecular weight of approximately 1000 g per mole with 100% by weight of ethoxy groups in the polymer chain, and also containing a terminal SO$_3$$^-$Na$^+$ group, is used. To this end, 50 g of an essentially trifunctional polyisocyanate containing biuret groups based on 1,6-hexamethylenediisocyanate, containing 23% free NCO groups, is reacted with 50 g of a trifunctional polyol based on trimethylolpropane containing 11% by weight of OH groups and with an average molecular weight of 500 g per mole, as well as 5 g of sulfonated 1,3-diol polyether containing 3% by weight of OH groups and with an average molecular weight of approximately 100 g per mole. As additives to the polyol, 0.05 g of dibutyltin dilaurate is added as catalyst, and 0.1 g of a fluorinated alkyl ester as a leveling agent.

The mixture is stirred vigorously for 10 minutes at room temperature. The reaction mixture thus homogenized is poured with a layer thickness of 0.5 mm on glass plates heated to approximately 60° C. The curing reaction takes place for 30 minutes at 90° C.

After 48 hours of storage at 20° C. and 50% relative humidity, the sheets are detached and their properties are determined as follows:

| | |
|---|---|
| Modulus E | 7.3 +/− 0.2 N/mm$^2$ |
| Increase of turbidity from abrasion | 4.0% |
| Microscratch hardness | 27 p |
| Contact angle (mesured on the surface of the sheet that was in contact with the surface of the glass) | 44 degrees |

The mechanical properties of this coating are accordingly within the requred limits, while the behavior toward condensation is significantly improved at the same time.

EXAMPLE 2

A reaction mixture like that described in Example 1 is prepared, but in which the quantity of sulfonated 1,3-diol polyether with a 3% content of OH groups by weight and an average molecular weight of approximately 1000 g per mole is increased to 15 g.

The specimens thus prepared are again kept for 48 hours at 20° C. and at a relative humidity of 50%. The properties of the coatings are then determined as follows:

| | |
|---|---|
| Modulus E | 5.7 +/− 0.2 N/mm$^2$ |
| Increase of turbidity from abrasion | 2.4% |
| Microscratch hardness | 22 p |
| Contact angle (measured on the surface of the sheet that was in contact with the surface of the glass) | 40 degrees |

The mechanical properties are thus within the indicated limits in this case also, while the behavior toward condensation is also significantly improved.

EXAMPLE 3

A reaction mixture is prepared in which a difunctional sulfonated polyoxyalkylene ether containing 1.4% by weight of OH groups, with an average molecular weight of approximately 2500 g per mole, and with 100% by weight of ethoxy groups in the polymer chain, containing a terminal SO$_3$$^-$Na$^+$ group, is used.

To this end, 50 g of an essentially trifunctional polyisocyanate containing biuret groups based on 1,6-hexamethylenediisocyanate, containing 23% by weight of free NCO groups, is reacted with 50 g of a polyfunctional polyol based on trimethylolpropane that contains 11% by weight of OH groups and has an average molecular weight of 500 g per mole, and at the same time with 10 g of the sulfonated 1,3-diol polyether containing 1.4% by weight of OH groups and with an average molecular weight of approximately 2500 g per mole.

As additives to the polyols, 0.05 g of dibutyltin dilaurate is added as catalyst, and 0.1 g of a fluorinated alkyl ester as a leveling agent.

The mixture is stirred vigorously at room temperature for 10 minutes. The reaction mixture thus homogenized is then converted in the same way as in the examples described above into cured sheets on which the indicated measurements are made.

The measured values thus obtained are as follows:

| | |
|---|---|
| Modulus E | 6.9 +/− 0.4 N/mm² |
| Increase of turbidity from abrasion | 2.7% |
| Microscratch hardness | 25 p |
| Contact angle (measured on the surface of the sheet that was in contact with the surface of the glass) | 37 degrees |

Accordingly, this coating also shows properties because of which it is suitable for practical application from the point of view of its mechanical behavior and from the point of view of its behavior toward condensation.

EXAMPLE 4

A reaction mixture is prepared according to one of the Examples 1 to 3, but in which a difunctional sulfonated polyoxyalkylene ether with an average molecular weight of approximately 1000 g per mole, containing 15% by weight of propoxy groups and 85% by weight of ethoxy groups, and having a terminal $SO_3^-Na^+$ group is used. The quantity of thus sulfonated polyoxyalkylene ether in the mixture is 10 g. The mixture is converted into a cured coating as in Example 1, on which the measurements are made.

The measured values below are this obtained:

| | |
|---|---|
| Modulus E | 6.2 +/− 0.5 N/mm² |
| Increase of turbidity from abrasion | 2.8% |
| Microscratch hardness | 18 p |
| Contact angle (measured on the surface of the sheet that was in contact with the surface of the glass) | 42 degrees |

In this case also, the mechanical values are between the limits indicated above and the coating shows a significantly improved behavior toward condensation.

EXAMPLE 5

A reaction mixture is prepared according to one of the preceding examples, but in which a difunctional sulfonated polyoxyalkylene ether with an average molecular weight of approximately 1300 g per mole, containing 100% by weight of ethoxy groups in the polymer chain, and with a terminal $SO_{33}^-NH_4^+$ radical is used. The quantity of this sulfonated polyoxyalkylene ether of the 1,3-diol polyether in the reaction mixture is 10 g. The reaction mixture is converted into a sheet as described in Example 1, on which the measurements are made.

The following measured values are obtained:

| | |
|---|---|
| Modulus E | 2.2 +/− 0.1 N/mm² |
| Increase of turbidity from abrasion | 1.5% |
| Microscratch hardness | 10 p |
| Contact angle (glass side) | 38 degrees |

The mechanical values are again within the required limits and the coating has good anticondensation properties.

The invention also concerns the monolithic windows or panes of glass and/or plastic material provided with a coating having the characteristics described above.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Transparent coating for windows or other substrates made of glass or synthetic resin, comprising a flexible elastic polyurethane that is prepared from a reaction mixture consisting essentially of an isocyanate component which consists essentially of trifunctional aliphatic polyisocyanates of biuret or isocyanurate structure based on 1,6-hexamethylenediisocyanate, containing 15 to 25% by weight of NCO groups and with an average molecular weight of approximately 450 to approximately 1000 g per mole, and a polyol component which contains at least one polyfunctional polyol, and which may contain a reaction catalyst and other auxiliary substances, wherein said polyol component of the reaction mixture comprises a difunctional sulfonated polyether polyol containing 1 to 10% by weight of OH groups and a trifunctional polyol containing approximately 8 to 12% by weight of OH groups and having an average molecular weight of approximately 400 to approximately 1000 g per mole.

2. Transparent coating pursuant to claim 1, wherein said polyether polyol comprises a polyoxyalkylene ether of the formula $$R^1CH_2O-(C_2H_4O-)_n(C_3H_6O-)_mCH_2CHR^3CH_2-SO_2X$$

in which
$R^1 = HO-CH_2-CH(OH)-$, $C(CH_2OH)_2(R^2)-$
$R^2 = CH_3-$, $C_2H_5-$, $C_3H_7-$,
$R^3 = H-$ or $CH_3-$,
$X = H-$, alkali metal or ammonium ion
$n = 0$ to 100,
$m = 0$ to 30,
$n + m > 1$.

3. Transparent coating pursuant to claim 1, wherein said sulfonated polyoxyalkylene ether has an average molecular weight of approximately 500 to approximately 5000 g per mole.

4. Transparent coating of claim 3, wherein said molecular weight is approximately 2000 g per mole.

5. Transparent coating pursuant to claim 1, wherein the sulfonated polyoxyalkylene ether used is comprised of ethoxy and propoxy groups with at least 50% by weight of ethoxy groups in the chain.

6. Transparent coating pursuant to claim 5, wherein the sulfonated polyoxyalkylene ether has an ethoxy/propoxy ratio of approximately 80:20.

7. Transparent coating pursuant to claim 1, wherein the proportion of the sulfonated polyoxyalkylene ether in the reaction mixture is 5 to 15% by weight.

8. Transparent coating pursuant to claim 1, wherein the trifunctional polyol comprises a polyether polyol comprised of one of the group consisting of trimethylolpropane and the reaction product of glycerin and propylene oxide.

9. Transparent coating pursuant to claim 1, wherein a polyester polyol lactone based on trimethylolpropane or the reaction product of glycerin and epsilon-caprolactone is used as the trifunctional polyol.

10. Transparent coating pursuant to claim 1, wherein said reaction mixture has an NCO/OH ratio of 0.8 to 1.1.

11. Transparent coating pursuant to claim 10, wherein said NCO/OH ratio is approximately 0.9.

12. Transparent coating pursuant to claim 1, wherein said reaction mixture comprises one or more leveling agents in an amount of 0.05 to 0.15% by weight.

13. Transparent coating pursuant to claim 1, wherein the reaction mixture contains 0.5 to 2% by weight of bis(1,2,2,6,6-pentamethyl-4-piperidyl) sebacate as an agent for protection against light.

14. Transparent coating pursuant to one claim 1, wherein the reaction mixture contains agents that absorb ultraviolet light in an amount of 0.5 to 5% by weight.

15. Monolithic window or pane made of glass and/or plastic material, provided with a coating pursuant to one claim 1.

* * * * *